United States Patent Office 3,334,106
Patented Aug. 1, 1967

3,334,106
N(ARYL)N(HYDROCARBYL) - ω - (4 - PHENYL-
4 - PIPERIDINOCARBONYLHETEROAMINE)
ALKANOAMIDE
John H. Biel, Milwaukee, Wis., assignor to Aldrich Chemical Company, Inc., Milwaukee, Wis., a corporation of Wisconsin
No Drawing. Filed Oct. 20, 1964, Ser. No. 408,453
10 Claims. (Cl. 260—294)

This invention relates to novel compounds. More particularly, this invention relates to novel compounds which possess valuable therapeutic utility as antiarrhythmic agents. In another aspect, this invention relates to a novel method of treating cardiac arrhythmia.

It is an object of this invention to provide a new class of therapeutic compounds. It is another object of the present invention to provide novel compounds having antiarrhythmic activity. It is a further object of the present invention to provide a novel method of treating cardiac arrhythmia.

These and other objects which may appear as the specification proceeds are achieved by this invention which comprises the provision of compounds selected from the group consisting of compounds of the formula (I)

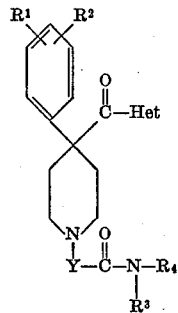

and the pharmaceutically acceptable nontoxic salts thereof. In Formula I,

Het is a heterocyclic ring selected from the group consisting of pyrrolidino, piperidino, morpholino, N'-(lower)alkylpiperazino, N'-hydroxy(lower)alkylpiperazino, N'-hydroxypiperidino, imidazolino, 1,2,3,4-tetrahydroisoquinolino, 1,2,5,6 - tetrahydropyridino, hexamethyleneimino;
$R^1$ and $R^2$ are each a member selected from the group consisting of hydrogen, chloro, bromo, iodo, fluoro, trifluoromethyl, (lower)alkyl, (lower)alkoxy, (lower) alkylthio, di(lower)alkylsulfamyl, phenyl, phenoxy, benzyl, and when taken together, methylenedioxy;
$R^3$ is a member selected from the group consisting of hydrogen, (lower)alkyl, (lower)alkenyl, (lower) alkynyl and clcloalkyl radicals having from 3 to 7 carbon atoms inclusive;
$R^4$ is a member selected from the group consisting of thienyl, pyridyl, pyrimidyl, isoxazolyl, thienyl(lower)alkyl, pyridyl(lower)alkyl, naphthyl, Ph-, Ph-(lower)alkyl, Ph-(lower)alkenyl and Ph-cyclopropyl, wherein Ph- is a radical of the formula (II)

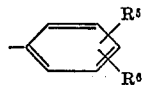

wherein $R^5$ and $R^6$ are each a member selected from the group consisting of hydrogen, chloro, bromo, iodo, fluoro, trifluoromethyl, (lower)alkyl, (lower)alkoxy, (lower alkylthio, di-lower)alkylsulfamyl, phenyl, phenoxy, benzyl, and when taken together, methylenedioxy; and
Y is (lower)alkylene.

The pharmaceutically acceptable nontoxic salts include the organic and inorganic mono- and di-acid addition salts, e.g., those prepared from acids such as hydrochloric, sulfuric, sulfamic, tartaric, fumaric, hydrobromic, hydriodic, glycolic, citric, maleic, phosphoric, succinic, acetic, nitric and the like.

The term "(lower)alkyl" as used herein means both straight and branched chain alkyl radicals containing from 1 to 8 carbon atoms, e.g. methyl, ethyl, propyl, isopropyl, butyl, isobutyl, t-butyl, amyl, hexyl, 2-ethylhexyl, etc.

The term "(lower)alkenyl" as used herein means both straight and branched chain alkenyl radicals containing from 1 to 8 carbon atoms, e.g. ethenyl, allyl, 1-propenyl, 1-butenyl, 3-butenyl, 2-methyl-1-propenyl, 3-pentenyl, 1-hexenyl, 7-octenyl, etc.

The term "(lower)alkynyl" as used herein means both straight and branched chain alkynyl radicals containing from 1 to 8 carbon atoms, e.g. ethinyl, propargyl, 1-butinyl, 2-butinyl, 1,1-dimethylpropargyl, 1-pentinyl, 1-heptinyl, etc.

The term "(lower)alkylene" as used herein means both straight and branched chain alkylene radicals containing from 1 to 8 carbon atoms, e.g. methylene, ethylene, octylene, propylene, butylene, isobutylene, t-butylene, amylene, hexylene, 2-ethylhexylene, etc.

Similarly, where the term "(lower)" is used as part of the description of another group, e.g., (lower)alkoxy, it refers to the alkyl portion of such group which is therefore as described in connection with "(lower)alkyl."

Preferred compounds of the present invention are those having the following formulae (III)

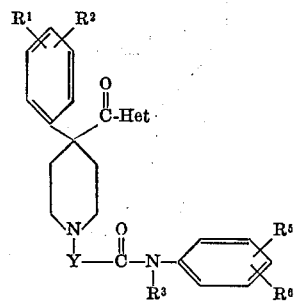

(IV)

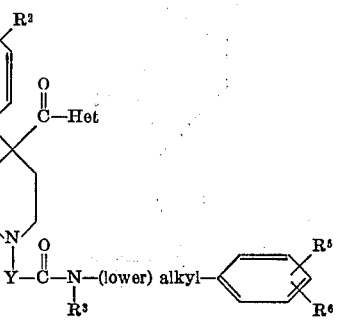

(V) 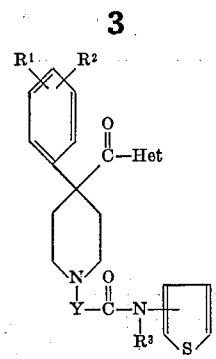
(VI) 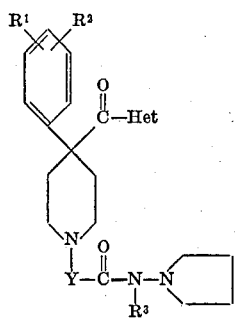
(VII) 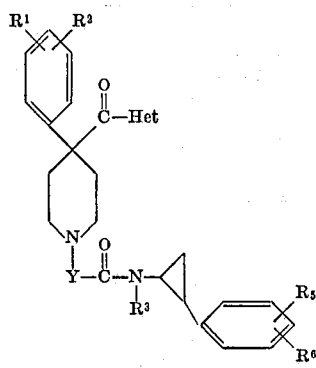
(VIII) 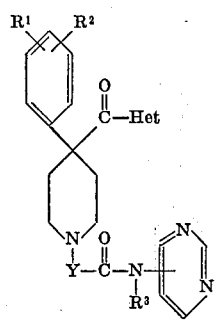
(IX) 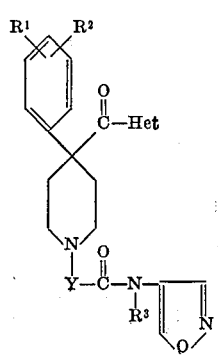
Still more preferred compounds of the present invention are those having the following formulae
(X) 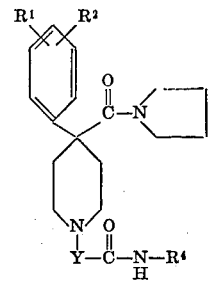
(XI) 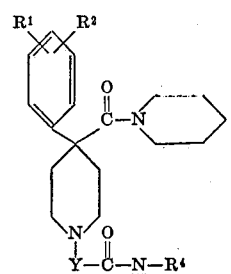
(XII) 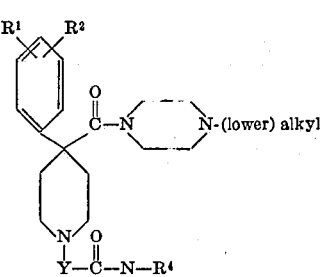
(XIII) 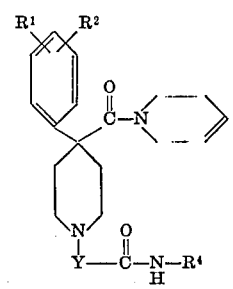
(XIV) 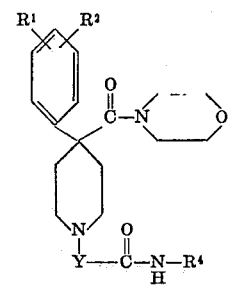
(XV) 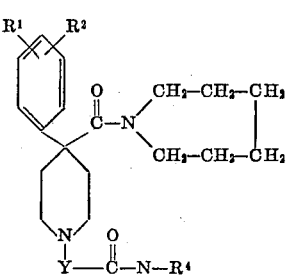

(XVI) 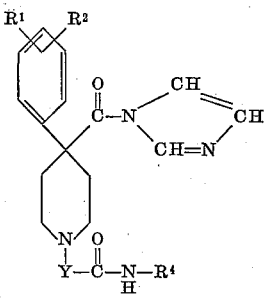

(XVII) 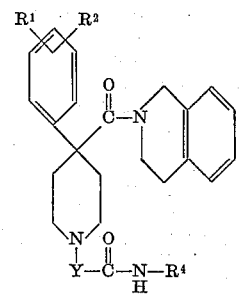

The compounds of this invention are valuable pharmaceutical agents. They exhibit antiarrhythmic activity which makes the compounds useful for the treatment of cardiac arrhythmia.

Tests of the compounds of the present invention for antiarrhythmic activity were carried out by administering the compounds in dosages of 10 mg./kg. intraperitoneally to experimental animals in which electrically-induced ventricular fibrillation could be induced. Prevention of the ventricular fibrillation by a test compound, for example, N-benzyl-$\beta$-(4-phenyl-4-pyrrolidinocarbonylpiperidino)propionamide hydrochloride, N-(2-phenylcyclopropyl)-$\beta$-(4-phenyl-4-pyrrolidinocarbonylpiperidino)propionamide hydrochloride, N-benzyl-$\beta$-(4-phenyl-4-piperidinocarbonylpiperidino)propionamide hydrochloride, indicates that the compound is an antiarrhythmic agent.

The compounds of the present invention are prepared by contacting a piperidine of the formula (XVIII) 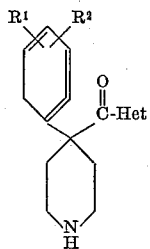

wherein Het, R¹ and R² are as defined above, with a halo- or tosylalkanoic acid amide of the formula (XIX) 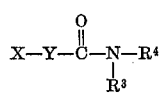

wherein R³, R⁴ and Y are as defined above, and X is a reactive alkylating group such as chloro, bromo, iodo, tosyl and methylsulfonyl. The reaction is carried out in the presence of an inert solvent such as N,N-dimethylformamide, toluene, xylene or diethoxydiethyleneglycol dimethyl ether, and an acid acceptor such as potassium carbonate, N,N-dimethylaniline or aminopyrine. Usually the reaction is carried out at elevated temperatures, i.e., temperature above room temperature, to insure completion of the reaction. Isolation of the novel amides of Formula I is achieved by extraction or crystallization from aqueous solution.

Some of the piperidines of Formula XVIII which may be employed in this process are, 4-phenyl-4-pyrrolidinocarbonylpiperidine,
4-phenyl-4-morpholinocarbonylpiperidine,
4-phenyl-4-piperidinocarbonylpiperidine,
4-phenyl-4-N'-hydroxypiperidinocarbonylpiperidine,
4-phenyl-4-hexamethyleneiminocarbonylpiperidine,
4-phenyl-4-N'-methylpiperazinocarbonylpiperidine,
4-2-chlorophenyl-4-pyrrolidinocarbonylpiperidine,
4-2-trifluoromethylphenyl-4-pyrrolidinocarbonylpiperidine,
4-4-ethoxyphenyl-4-pyrrolidinocarbonylpiperidine and
4-2-hydroxyphenyl-4-pyrrolidinocarbonylpiperidine.

Some of the halo- or tosylalkanoic acid amides which may be employed in this reaction are, N-benzyl-$\beta$-chloropropionamide,
N-3-trifluoromethylbenzyl-$\beta$-chloropropionamide,
N-4-ethoxybenzyl-$\beta$-chloropropionamide,
N-2,6-dimethylbenzyl-$\beta$-chloropropionamide,
N-3,4-methylenedioxybenzyl-$\beta$-chloropropionamide,
N-3,4-dimethoxybenzyl-$\beta$-chloropropionamide,
N-4-methoxybenzyl-$\beta$-chloropropionamide,
N-4-chlorobenzyl-$\beta$-chloropropionamide,
N-2-fluorobenzyl-$\beta$-chloropropionamide,
N-4-trifluoromethylbenzyl-$\beta$-chloropropionamide,
N-2-ethoxybenzyl-$\beta$-chloropropionamide,
N-2,4-dimethylbenzyl-$\beta$-chloropropionamide,
N-3,4-dichlorobenzyl-$\beta$-chloropropionamide,
N-2,6-dimethoxybenzyl-$\beta$-chloropropionamide,
N-2-trifluoromethylbenzyl-$\beta$-chloropropionamide,
N-4-methylbenzyl-$\beta$-chloropropionamide,
N-phenethyl-$\beta$-bromopropionamide,
N-$\alpha$-methylphenethyl-$\beta$-bromopropionamide,
N-4-chlorophenethyl-$\beta$-bromopropionamide,
N-4-dimethylsulfamylphenethyl-$\beta$-bromopropionamide,
N-4-phenoxyphenethyl-$\beta$-bromopropionamide,
N-phenethyl-$\gamma$-bromobutyramide,
N-methyl-N-phenethyl-$\gamma$-bromobutyramide,
N-propargyl-N-cinnamyl-$\gamma$-bromobutyramide,
N-cyclopropyl-N-phenethyl-$\gamma$-bromobutyramide,
N-dimethallyl-N-phenethyl-$\gamma$-bromobutyramide,
N-phenethyl-$\beta$-chlorobutyramide,
N-phenethyl-$\gamma$-bromocrotonamide,
N-2-phenylcyclopropyl-$\beta$-chloropropionamide,
N-2-4-trifluoromethylphenylcyclopropyl-$\beta$-chloropropionamide and
N-2-(3,4-methylenedioxyphenyl)cyclopropyl-$\beta$-chloropropionamide.

Representative of the novel amides of this invention which may be obtained in the foregoing manner are N-benzyl-$\beta$-(4-phenyl-4-pyrrolidinocarbonylpiperidino)propionamide,
N-benzyl-$\beta$-(4-phenyl-4-morpholinocarbonylpiperidino)propionamide,
N-($\alpha$-methylphenethyl)-$\beta$-(4-phenyl-4-N'-methylpiperazinocarbonylpiperidino)propionamide,
N-phenethyl-$\beta$-(4-phenyl-4-1,2,3,4-tetrahydroisoquinolinocarbonylpiperidino)propionamide,
N-3,4-methylenedioxyphenethyl-$\beta$-(4-phenyl-4-pyrrolidinocarbonylpiperidino)propionamide,
N-3,4-dimethoxyphenethyl-$\beta$-(4-phenyl-4-piperidinocarbonylpiperidino)propionamide,
N-2,6-dimethylbenzyl-$\beta$-(4-phenyl-4-1,2,3,4-tetrahydroisoquinolinocarbonylpiperidino)propionamide,
N-4-trifluoromethylphenethyl-$\beta$-(4-4-chlorophenyl-4-pyrrolidinocarbonylpiperidino)propionamide and
N-2-phenylcyclopropyl-$\beta$-(4-phenyl-4-piperidinocarbonylpiperidino)propionamide.

The starting materials, i.e., the compounds of Formulae XVIII and XIX used in the process described herein are compounds which are either commercially available, well-known in the art, or easily prepared in accordance with standard organic procedures previously described in the chemical literature. The starting piperidines of Formula XVIII are obtained by methods described in United States Patent No. 3,097,209 and British Patent No. 931,789. The starting halo- or tosylalkanoic acid amides of Formula XIX are described in United States Patent Nos. 2,929,818, 2,937,180 and 3,124,586. The general reaction for preparing the novel compounds of this invention is also described in United States Patent Nos. 2,929,818, 2,937,180 and 3,124,586.

The compositions of this invention when administered orally or parenterally in an effective amount are effective in the treatment of cardiac arrhythmia. The usual dosage is from 10 to 200 mg./kg.; although lesser or greater quantities may be used.

The following examples are intended to illustrate the invention described herein without unduly restricting it.

EXAMPLE 1

*Preparation of N-benzyl-β-(4-phenyl-4-pyrrolidinocarbonylpiperidino)propionamide*

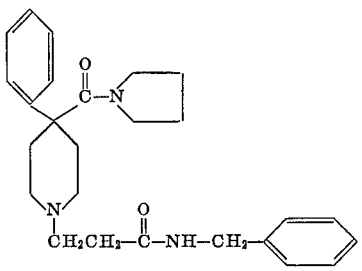

A mixture of 4-phenyl-4-pyrrolidinocarbonylpiperidine (12.9 gm., 0.05 mol), N-benzyl-β-chloropropionamide (9.85 gm., 0.05 mol), triethylamine (5.1 gm., 0.05 mol) and dimethylformamide (35 ml.) was stirred at 70° C. for 1.5 hours. The resulting viscous mixture was added to water (300 ml.) containing sodium hydroxide (2 gm., 0.05 mol). The product, N-benzyl-β-(4-phenyl-4-pyrrolidinocarbonylpiperidino)propionamide, separated as a solid, having a melting point of 139–142° C.

EXAMPLE 2

*Preparation of N-benzyl-β-(4-phenyl-4-pyrrolidinocarbonylpiperidino)propionamide hydrochloride*

The N - benzyl-β-(4-phenyl - 4 - pyrrolidinocarbonylpiperidino)propionamide of Example 1 was dissolved in methylene chloride through which a stream of anhydrous hydrogen chloride was then passed. The solid salt was collected and recrystallized from a mixture of isopropanol-n-butanol. The purified salt, N-benzyl-β-(4-phenyl-4-pyrrolidinocarbonylpiperidino)propionamide hydrochloride weighed 7.2 gm., and had a melting point of 256–258° C.

*Analysis.*—Calc'd for $C_{26}H_{34}ClN_3O_2$: C, 68.48; H, 7.52; N, 9.22; Cl, 7.78. Found: C, 68.12; H, 7.56; N, 8.98; Cl, 7.63.

EXAMPLE 3

*Preparation of N-(2-phenylcyclopropyl)-β-(4-phenyl-4-pyrrolidinocarbonylpiperidino)propionamide*

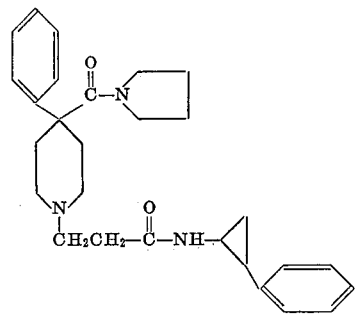

A mixture of 4-phenyl-4-pyrrolidinocarbonylpiperidine (9.5 gm., 0.034 mol), N-(2-phenylcyclopropyl)-β-chloropropionamide (8.25 gm., 0.034 mol), triethylamine (3.7 gm., 0.037 mol) and dimethylformamide (30 ml.) was stirred and heated to 70° C. for 3 hours. When cool, the mixture was added to water containing sodium hydroxide. The free base which separated as an oil did not crystallize. It was separated from the water and dissolved in methylene chloride. This solution was dried over anhydrous potassium carbonate giving the product, N-(2-phenylcyclopropyl)-β-(4-phenyl - 4 - pyrrolidinocarbonylpiperidino) propionamide.

EXAMPLE 4

*Preparation of N-(2-phenylcyclopropyl) - β - (4-phenyl-4-pyrrolidinocarbonylpiperidino) propionamide hydrochloride*

A solution of N-(2-phenylcyclopropyl)-β-(4-phenyl-4-pyrrolidinocarbonylpiperidino)propionamide prepared in Example 3 in methylene chloride was treated with a stream of gaseous hydrogen chloride. The salt which formed was collected and purified by recrystallization from anhydrous ethanol. The pure salt, N-(2-phenylcyclopropyl)-β-(4-phenyl - 4 - pyrrolidinocarbonylpiperidino) propionamide hydrochloride, weighed 7.1 gm., and had a melting point of 207–208° C.

*Analysis.*—Calc'd for $C_{28}H_{36}ClN_3O_2$: C, 69.77; H, 7.53; N, 8.72, Cl, 7.36. Found: C, 70.07; H, 7.52; N, 8.53; Cl, 7.34.

EXAMPLE 5

*Preparation of N-benzyl-β-(4-phenyl-4-piperidinocarbonylpiperidino)propionamide*

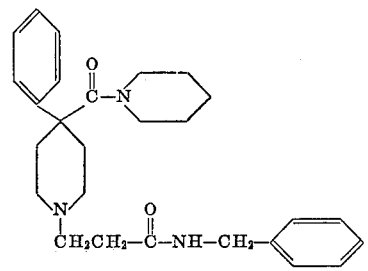

A mixture of 4-phenyl-4-piperidinocarbonylpiperidine (14 gm., 0.05 mol), N-benzyl-β-chloropropionamide (9.4 gm., 0.05 mol), triethylamine (5.2 gm., 0.05 mol), and anhydrous ethanol (50 ml.) was stirred and heated to a temperature of 70° C. for 4 hours. The mixture was cooled and poured into water (100 ml.) containing sodium hydroxide (2 gm., 0.05 mol). An oil formed which did not crystallize upon standing. The water layer was removed, and the base, N-benzyl-β-(4-phenyl-4-piperidinocarbonylpiperidino)propionamide, collected in methylene chloride.

EXAMPLE 6

*Preparation of N-benzyl-β-(4-phenyl-4-piperidinocarbonylpiperidino)propionamide hydrochloride*

The free base, N-benzyl-β-(4-phenyl-4-piperidinocarbonylpiperidino)propionamide, dissolved in methylene chloride was treated with a stream of gaseous hydrogen chloride. The salt which separated was collected and purified by recrystallization from n-butanol. The pure salt, N - benzyl - β-(4-phenyl-4-piperidinocarbonylpiperidino)propionamide hydrochloride, weighed 9.8 gm., and had a melting point of 241.5–242° C.

*Analysis.*—Calc'd for $C_{27}H_{36}ClN_3O_2$: C, 68.99, H, 7.72; N, 8.94; Cl, 7.54. Found: C, 68.91; H, 7.61; N, 10.98; Cl, 7.49.

EXAMPLE 7

When, in the procedure of Example 1, N-benzyl-β-chloropropionamide is replaced by an equal molar amount of N-β-naphthyl-β-chloropropionamide,
N-α-naphthyl-β-chloropropionamide, N-3-thienyl-β-chloropropionamide,
N-2-thienyl-β-chloropropionamide,
N-1-pyridyl-β-chloropropionamide,
N-3-thienylmethyl-β-chloropropionamide,
N-1-pyridylmethyl-β-chloropropionamide,
N-2-thienylethyl-β-chloropropionamide,
N-4-isoxazolyl-β-chloropropionamide,
N-1-pyrimidyl-β-chloropropionamide,
N-3-chlorobenzyl-β-chloropropionamide,
N-3-methyl-4-chlorobenzyl-β-chloropropionamide,
N-3-methoxybenzyl-β-chloropropionamide,
N-3,4-methylenedioxybenzyl-β-chloropropionamide,
N-2,6-dibromobenzyl-β-chloropropionamide,
N-3,4-dimethylbenzyl-β-chloropropionamide,
N-2-bromo-4-chlorobenzyl-β-chloropropionamide,
N-4-fluorobenzyl-β-chloropropionamide,
N-4-trifluoromethylbenzyl-β-chloropropionamide,
N-3-methylthiobenzyl-β-chloropropionamide,
N-2-methoxybenzyl-β-chloropropionamide,
N-2,6-dimethoxybenzyl-β-chloropropionamide,
N-phenethyl-β-chloropropionamide,
N-4-iodobenzyl-β-chloropropionamide,
N-3-fluorobenzyl-β-chloropropionamide,
N-4-methylbenzyl-β-chloropropionamide,
N-2-butylbenzyl-β-chloropropionamide,
N-3-benzylbenzyl-β-chloropropionamide,
N-4-phenylbenzyl-β-chloropropionamide,
N-4-phenoxybenzyl-β-chloropropionamide,
N-3-dimethylsulfamylbenzyl-β-chloropropionamide,
N-phenylisopropyl-β-chloropropionamide,
N-phenyl-β-chloropropionamide,
N-4-trifluoromethylphenyl-β-chloropropionamide,
N-3-chlorophenyl-β-chloropropionamide,
N-4-methylphenyl-β-chloropropionamide,
N-2-pentylphenyl-β-chloropropionamide,
N-3-phenoxyphenyl-β-chloropropionamide,
N-4-phenylphenyl-β-chloropropionamide,
N-2-benzylphenyl-β-chloropropionamide,
N-4-methylthiophenyl-β-chloropropionamide,
N-3-methoxyphenyl-β-chloropropionamide,
N-2,6-dimethylphenyl-β-chloropropionamide,
N-2-bromophenyl-β-chloropropionamide,
N-3-iodophenyl-β-chloropropionamide,
N-4-fluorophenyl-β-chloropropionamide,
N-3-dimethylsulfamylphenyl-β-chloropropionamide,
N-cinnamyl-β-chloropropionamide,
N-cyclopropyl-N-benzyl-β-chloropropionamide,
N-cyclopropyl-N-phenyl-β-chloropropionamide,
N-cyclohexyl-N-benzyl-β-chloropropionamide,
N-methyl-N-benzyl-β-chloropropionamide,
N-allyl-N-benzyl-β-chloropropionamide,
N-propargyl-N-phenyl-β-chloropropionamide,
N-1-butinyl-N-4-trifluoromethylbenzyl-β-chloropropionamide,
N-1-propenyl-N-1-pyridyl-β-chloropropionamide,
N-isopropyl-N-cinnamyl-β-chloropropionamide,
N-benzyl-α-chloroacetamide,
N-benzyl-α-chloropropionamide,
N-benzyl-γ-chlorobutyramide,
N-benzyl-α-chloroisobutyramide,
N-benzyl-γ-chlorohexanoamide,
N-4-trifluoromethylbenzyl-α-chloroacetamide,
N-phenyl-α-chloroacetamide,
N-3-thienyl-α-chloropropionamide, and
N-methyl-N-benzyl-α-chloroacetamide, there are produced, N-(β-naphthyl)-β-(4-phenyl-4-pyrrolidinocarbonyl-piperidino)propionamide,
N-(α-naphthyl)-β-(4-phenyl-4-pyrrolidinocarbonyl-piperidino)propionamide,
N-(3-thienyl)-β-(4-phenyl-4-pyrrolidinocarbonyl-piperidino)propionamide,
N-(2-thienyl)-β-(4-phenyl-4-pyrrolidinocarbonyl-piperidino)propionamide,
N-(1-pyridyl)-β-(4-phenyl-4-pyrrolidinocarbonyl-piperidino)propionamide,
N-(3-thienylmethyl)-β-(4-phenyl-4-pyrrolidinocarbonyl-piperidino)propionamide,
N-(1-pyridylmethyl)-β-(4-phenyl-4-pyrrolidinocarbonyl-piperidino)propionamide,
N-(2-thienylethyl)-β-(4-phenyl-4-pyrrolidinocarbonyl-piperidino)propionamide,
N-(4-isoxazolyl)-β-(4-phenyl-4-pyrrolidinocarbonyl-piperidino)propionamide,
N-(1-pyrimidyl)-β-(4-phenyl-4-pyrrolidinocarbonyl-piperidino)propionamide,
N-(3-chlorobenzyl)-β-(4-phenyl-4-pyrrolidinocarbonyl-piperidino)propionamide,
N-(3-methyl-4-chlorobenzyl)-β-(4-phenyl-4-pyrrolidinocarbonylpiperidino)propionamide,
N-(3-methoxybenzyl)-β-(4-phenyl-4-pyrrolidinocarbonyl-piperidino)propionamide,
N-(3,4-methylenedioxybenzyl)-β-(4-phenyl-4-pyrrolidinocarbonylpiperidino)propionamide,
N-(2,6-dibromobenzyl)-β-(4-phenyl-4-pyrrolidinocarbonylpiperidino)propionamide,
N-(3,4-dimethylbenzyl)-β-(4-phenyl-4-pyrrolidinocarbonylpiperidino)propionamide,
N-(2-bromo-4-chlorobenzyl)-β-(4-phenyl-4-pyrrolidinocarbonyl)piperidino)propionamide,
N-(4-fluorobenzyl)-β-(4-phenyl-4-pyrrolidinocarbonyl-piperidino)propionamide,
N-(4-trifluoromethylbenzyl)-β-(4-phenyl-4-pyrrolidinocarbonylpiperidino)propionamide,
N-(3-methylthiobenzyl)-β-(4-phenyl-4-pyrrolidinocarbonylpiperidino)propionamide,
N-(2-methoxybenzyl)-β-(4-phenyl-4-pyrrolidinocarbonyl-piperidino)propionamide,
N-(2,6-dimethoxybenzyl)-β-(4-phenyl-4-pyrrolidinocarbonylpiperidino)propionamide,
N-(phenethyl)-β-(4-phenyl-4-pyrrolidinocarbonyl-piperidino)propionamide,
N-(4-iodobenzyl)-β-(4-phenyl-4-pyrrolidinocarbonyl-piperidino)propionamide,
N-(3-fluorobenzyl)-β-(4-phenyl-4-pyrrolidinocarbonyl-piperidino)propionamide,
N-(4-methylbenzyl)-β-(4-phenyl-4-pyrrolidinocarbonyl-piperidino)propionamide,
N-(2-butylbenzyl)-β-(4-phenyl-4-pyrrolidinocarbonyl-piperidino)propionamide,
N-(3-benzylbenzyl)-β-(4-phenyl-4-pyrrolidinocarbonyl-piperidino)propionamide,
N-(4-phenylbenzyl)-β-(4-phenyl-4-pyrrolidinocarbonyl-piperidino)propionamide,
N-(4-phenoxyphenzyl)-β-(4-phenyl-4-pyrrolidinocarbonylpiperidino)propionamide,
N-(3-dimethylsulfamylbenzyl)-β-(4-phenyl-4-pyrrolidinocarbonylpiperidino)propionamide,
N-(phenylisopropyl)-β-(4-phenyl-4-pyrrolidinocarbonyl-piperidino)propionamide,
N-(phenyl)-β-(4-phenyl-4-pyrrolidinocarbonyl-piperidino)propionamide,
N-(4-trifluoromethylphenyl)-β-(4-phenyl-4-pyrrolidinocarbonylpiperidino)propionamide,
N-(3-chlorophenyl)-β-(4-phenyl-4-pyrrolidinocarbonyl-piperidino)propionamide,
N-(4-methylphenyl)-β-(4-phenyl-4-pyrrolidinocarbonyl-piperidino)propionamide,
N-(2-pentylphenyl)-β-(4-phenyl-4-pyrrolidinocarbonyl-piperidino)propionamide,
N-(3-phenoxyphenyl)-β-(4-phenyl-4-pyrrolidinocarbonyl-piperidino)propionamide,
N-(4-phenylphenyl)-β-(4-phenyl-4-pyrrolidinocarbonyl-piperidino)propionamide,
N-(2-benzylphenyl)-β-(4-phenyl-4-pyrrolidinocarbonyl-piperidino)propionamide,
N-(4-methylthiophenyl)-β-(4-phenyl-4-pyrrolidinocarbonylpiperidino)propionamide,
N-(3-methoxyphenyl)-β-(4-phenyl-4-pyrrolidinocarbonyl-piperidino)propionamide, N-(2,6-dimethylphenyl)-β-(4-phenyl-4-pyrrolidinocarbonylpiperidino)propionamide,
N-(2-bromophenyl)-β-(4-phenyl-4-pyrrolidinocarbonylpiperidino)propionamide,
N-(3-iodophenyl)-β-(4-phenyl-4-pyrrolidinocarbonylpiperidino)propionamide,
N-(4-fluorophenyl)-β-(4-phenyl-4-pyrrolidinocarbonylpiperidino)propionamide,
N-(3-dimethylsulfamylphenyl)-β-(4-phenyl-4-pyrrolidinocarbonylpiperidino)propionamide,
N-(cinnamyl)-β-(4-phenyl-4-pyrrolidinocarbonylpiperidino)propionamide,
N-(cyclopropyl-N-benzyl)-β-(4-phenyl-4-pyrrolidinocarbonylpiperidino)propionamide,
N-(cyclopropyl-N-phenyl)-β-(4-phenyl-4-pyrrolidinocarbonylpiperidino)propionamide,
N-(cyclohexyl-N-benzyl)-β-(4-phenyl-4-pyrrolidinocarbonylpiperidino)propionamide,
N-(methyl-N-benzyl)-β-(4-phenyl-4-pyrrolidinocarbonylpiperidino)propionamide,
N-(allyl-N-benzyl)-β-(4-phenyl-4-pyrrolidinocarbonylpiperidino)propionamide,
N-(propargyl-N-phenyl)-β-(4-phenyl-4-pyrrolidinocarbonylpiperidino)propionamide,
N-(1-butinyl-N-4-trifluoromethylbenzyl)-β-(4-phenyl-4-pyrrolidinocarbonylpiperidino)propionamide,
N-(1-propenyl-N-1-pyridyl)-β-(4-phenyl-4-pyrrolidinocarbonylpiperidino)propionamide,
N-(isopropyl-N-minnamyl)-β-(4-phenyl-4-pyrrolidinocarbonylpiperidino)propionamide,
N-(benzyl)-α-(4-phenyl-4-pyrrolidinocarbonylpiperidino)acetamide,
N-(benzyl)-α-(4-phenyl-4-pyrrolidinocarbonylpiperidino)propionamide,
N-(benzyl)-γ-(4-phenyl-4-pyrrolidinocarbonylpiperidino)butyramide,
N-(benzyl)-α-(4-phenyl-4-pyrrolidinocarbonylpiperidino)isobutyramide,
N-(benzyl)-γ-(4-phenyl-4-pyrrolidinocarbonylpiperidino)hexanoamide,
N-(4-trifluoromethylbenzyl)-α-(4-phenyl-4-pyrrolidinocarbonylpiperidino)acetamide,
N-(phenyl)-α-(4-phenyl-4-pyrrolidinocarbonylpiperidino)acetamide,
N-(3-thienyl)-α-(4-phenyl-4-pyrrolidinocarbonylpiperidino)propionamide and
N-(methyl-N-benzyl)-α-(4-phenylpyrrolidinocarbonylpiperidino)acetamide, respectively.

EXAMPLE 8

When, in the procedure of Example 1, 4-phenyl-4-pyrrolidinocarbonylpiperidine is replaced by an equal molar amount of 4-phenyl-4-morpholinocarbonylpiperidine,
4-phenyl-4-1,2,3,4-tetrahydroisoquinolinocarbonylpiperidine,
4-phenyl-4-1,2,3,5,6-tetrahydropyridinocarbonylpiperidine,
4-phenyl-4-imidazolinocarbonylpiperidine,
4-phenyl-4-hexamethyleneiminocarbonylpiperidine,
4-phenyl-4-N′-methylipiperazinocarbonylpiperidine,
4-phenyl-4-N′-hydroxypiperazinocarbonylpiperidine,
4-phenyl-4-N′-hydroxyethylpiperazinocarbonylpiperidine,
4-phenyl-4-N′-ethylpiperazinocarbonylpiperidine,
4-4-trifluoromethylphenyl-4-pyrrolidinocarbonylpiperidine,
4-4-chlorophenyl-4-piperidinocarbonylpiperidine,
4-2-bromophenyl-4-pyrrolidinocarbonylpiperidine,
4-4-methylphenyl-4-pyrrolidinocarbonylpiperidine,
4-2,4-dimethylphenyl-4-pyrrolidinocarbonylpiperidine,
4-3,4-methylenedioxyphenyl-4-morpholinocarbonylpiperidine,
4-3-methoxyphenyl-4-morpholinocarbonylpiperidine,
4-4-ethylphenyl-4-piperidinocarbonylpiperidine,
4-2-phenylphenyl-4-piperidinocarbonylpiperidine,
4-3-iodophenyl-4-N′-methylpiperazinocarbonylpiperidine,
4-2-methylthiophenyl-4-pyrrolidinocarbonylpiperidine,
4-4-trifluoromethylphenyl-4-piperidinocarbonylpiperidine,
4-3-phenoxyphenyl-4-piperidinocarbonylpiperidine,
4-2-dimethylsulfamylphenyl-4-pyrrolidinocarbonylpiperidine,
4-3-benzylphenyl-4-pyrrolidinocarbonylpiperidine,
4-4-phenylphenyl-4-pyrrolidinocarbonylpiperidine,
4-2-trifluoromethylphenyl-4-morpholinocarbonylpiperidine,
4-2-chloro-4-methylphenyl-4-pyrrolidinocarbonylpiperidine,
4-3-chlorophenyl-4-hexamethyleneiminocarbonylpiperidine and
4-2,6-dichlorophenyl-4-pyrrolidinocarbonylpiperidine, there are obtained, N-(benzyl)-β-(4-phenyl-4-morpholinocarbonylpiperidino)propionamide,
N-(benzyl)-β-(4-phenyl-4-1,2,3,4-tetrahydroisoquinolinocarbonylpiperidino)propionamide,
N-(benzyl)-β-(4-phenyl-4-1,2,5,6-tetrahydropyridinocarbonylpiperidino)propionamide,
N-(benzyl)-β-(4-phenyl-4-imidazolinocarbonylpiperidino)propionamide,
N-(benzyl)-β-(4-phenyl-4-hexamethyleneiminocarbonylpiperidino)propionamide,
N-(benzyl)-β-(4-phenyl-4-N′-methylpiperazinocarbonylpiperidino)propionamide,
N-(benzyl)-β-(4-phenyl-4-N′-hydroxypiperazinocarbonylpiperidino)propionamide,
N-(benzyl)-β-(4-phenyl-4-N′-hydroxyethylpiperazinocarbonylpiperidino)propionamide,
N-(benzyl)-β-(4-phenyl-4-N′-ethylpiperazinocarbonylpiperidino)propionamide,
N-(benzyl)-β-(4-4-trifluoromethylphenyl-4-pyrrolidinocarbonylpiperidino)propionamide,
N-(benzyl)-β-(4-4-chlorophenyl-4-piperidinocarbonylpiperidino)propionamide,
N-(benzyl)-β-(4-2-bromophenyl-4-pyrrolidinocarbonylpiperidino)propionamide,
N-(benzyl)-β-(4-4-methylphenyl-4-pyrrolidinocarbonylpiperidino)propionamide,
N-(benzyl)-β-(4-2,4-dimethylphenyl-4-pyrrolidinocarbonylpiperidino)propionamide,
N-(benzyl)-β-(4-3,4-methylenedioxyphenyl-4-morpholinocarbonylpiperidino)propionamide,
N-(benzyl)-β-(4-3-methoxyphenyl-4-morpholinocarbonylpiperidino)propionamide,
N-(benzyl)-β-(4-4-ethylphenyl-4-piperidinocarbonylpiperidino)propionamide,
N-(benzyl)-β-(4-2-phenylphenyl-4-piperidinocarbonylpiperidino)propionamide,
N-(benzyl)-β-(4-3-iodophenyl-4-N′-methylpiperazinocarbonylpiperidino)propionamide,
N-(benzyl)-β-(4-2-methylthiophenyl-4-pyrrolidinocarbonylpiperidino)propionamide,
N-(benzyl)-β-(4-4-trifluoromethylphenyl-4-piperadinocarbonylpiperidino)propionamide,
N-(benzyl)-β-(4-3-phenoxyphenyl-4-piperidinocarbonylpiperidino)propionamide,
N-(benzyl)-β-(4-2-dimethylsulfamylphenyl-4-pyrrolidinocarbonylpiperidino)propionamide,
N-(benzyl)-β-(4-3-benzylphenyl-4-pyrrolidinocarbonylpiperidino)propionamide,
N-(benzyl)-β-(4,4-phenylphenyl-4-pyrrolidinocarbonylpiperidino)propionamide,
N-(benzyl)-β-(4-2-trifluoromethylphenyl-4-morpholinocarbonylpiperidino)propionamide,
N-(benzyl)-β-(4-2-chloro-4-methylphenyl-4-pyrrolidinocarbonylpiperidino)propionamide,
N-(benzyl)-β-(4-3-hexamethyleneiminocarbonylpiperidino)propionamide, and N-(benzyl)-β-(4-2,6-dichlorophenyl-4-pyrrolidinocarbonylpiperidino)propionamide, respectively.

EXAMPLE 9

When, in the procedure of Example 3, N-2-phenylcyclopropyl-β-chloropropionamide is replaced by an equal molar amount of N-2-4-chlorophenylcyclopropyl-β-chloropropionamide,
N-2-4-trifluoromethylphenylcyclopropyl-β-chloropropionamide,
N-2-4-methylphenylcyclopropyl-β-chloropropionamide,
N-2-2-fluorophenylcyclopropyl-β-chloropropionamide,
N-2-3-methylphenylcyclopropyl-β-chloropropionamide,
N-2-3-bromophenylcyclopropyl-β-chloropropionamide,
N-2-2-6-dichlorophenylcyclopropyl-β-chloropropionamide,
N-2-4-methylthiophenylcyclopropyl-β-chloropropionamide,
N-2-2-dimethylsulfamylphenylcyclopropyl-β-chloropropionamide,
N-2-2-iodo-4-methylphenylcyclopropyl-β-chloropropionamide,
N-2-4-isopropylphenylcyclopropyl-β-chloropropionamide,
N-2-4-phenylphenylcyclopropyl-β-chloropropionamide,
N-2-3-phenoxyphenylcyclopropyl-β-chloropropionamide,
N-2-4-benzylphenylcyclopropyl-β-chloropropionamide,
N-2-3,4-methylenedioxyphenylcyclopropyl-β-chloropropionamide,
N-2-4-fluorophenylcyclopropyl-β-chloropropionamide,
N-2-2,4-dimethylphenylcyclopropyl-β-chloropropionamide,
N-methyl-N-2-phenylcyclopropyl-β-chloropropionamide,
N-isopropyl-N-2-phenylcyclopropyl-β-chloropropionamide,
N-allyl-N-2-phenylcyclopropyl-β-chloropropionamide,
N-propargyl-N-2-phenylcyclopropyl-β-chloropropionamide,
N-butyl-N-2-phenylcyclopropyl-β-chloropropionamide,
N-ethinyl-N-2-phenylcyclopropyl-β-chloropropionamide,
N-1-butinyl-N-2-phenylcyclopropyl-β-chloropropionamide,
N-1-propenyl-N-2-phenylcyclopropyl-β-chloropropionamide,
N-ethyl-N-2-phenylcyclopropyl-β-chloropropionamide,
N-methyl-N-2-4-trifluoromethylphenylcyclopropyl-β-chloropropionamide,
N-allyl-N-2-4-fluorophenylcyclopropyl-β-chloropropionamide,
N-propargyl-N-2-3,4-methylenedioxyphenylcyclopropyl-β-chloropropionamide,
N-methyl-N-2-3-trifluoromethylphenylcyclopropyl-β-chloropropionamide,
N-methyl-N-2-2,6-dichlorophenylcyclopropyl-β-chloropropionamide,
N-methyl-N-2-2-methyl-4-trifluoromethylphenylcyclopropyl-β-chloropropionamide and
N-cyclopropyl-N-2-phenylcyclopropyl-β-chloropropionamide, there are produced, N-(2-4-chlorophenylcyclopropyl)-β-(4-phenyl-4-pyrrolidinocarbonylpiperidino)propionamide,
N-(2-4-trifluoromethylphenylcyclopropyl)-β-(4-phenyl-4-pyrrolidinocarbonylpiperidino)propionamide,
N-(2-4-methylphenylcyclopropyl)-β-(4-phenyl-4-pyrrolidinocarbonylpiperidino)propionamide,
N-(2-2-fluorophenylcyclopropyl)-β-(4-phenyl-4-pyrrolidinocarbonylpiperidino)propionamide,
N-(2-3-methylphenylcyclopropyl)-β-(4-phenyl-4-pyrrolidinocarbonylpiperidino)propionamide,
N-(2-3-bromophenylcyclopropyl)-β-(4-phenyl-4-pyrrolidinocarbonylpiperidino)propionamide,
N-(2-2,6-dichlorophenylcyclopropyl)-β-(4-phenyl-4-pyrrolidinocarbonylpiperidino)propionamide,
N-(2-4-methylthiophenylcyclopropyl)-β-(4-phenyl-4-pyrrolidinocarbonylpiperidino)propionamide,
N-(2-2-dimethylsulfamylphenylcyclopropyl)-β-(4-phenyl-4-pyrrolidinocarbonylpiperidino)propionamide,
N-(2-2-iodo-4-methylphenylcyclopropyl)-β-(4-phenyl-4-pyrrolidinocarbonylpiperidino)propionamide,
N-(2-4-isopropylphenylcyclopropyl)-β-(4-phenyl-4-pyrrolidinocarbonylpiperidino)propionamide,
N-(2-4-phenylphenylcyclopropyl)-β-(4-phenyl-4-pyrrolidinocarbonylpiperidino)propionamide,
N-(2-3-phenoxyphenylcyclopropyl)-β-(4-phenyl-4-pyrrolidinocarbonylpiperidino)propionamide,
N-(2-4-benzylphenylcyclopropyl)-β-(4-phenyl-4-pyrrolidinocarbonylpiperidino)propionamide,
N-(2-3,4-methylenedioxyphenylcyclopropyl)-β-(4-phenyl-4-pyrrolidinocarbonylpiperidino)propionamide,
N-(2-4-fluorophenylcyclopropyl)-β-(4-phenyl-4-pyrrolidinocarbonylpiperidino)propionamide,
N-(2-2,4-dimethylphenylcyclopropyl)-β-(4-phenyl-4-pyrrolidinocarbonylpiperidino)propionamide,
N-(methyl-N-2-phenylcyclopropyl)-β-(4-phenyl-4-pyrrolidinocarbonylpiperidino)propionamide,
N-(isopropyl-N-2-phenylcyclopropyl)-β-(4-phenyl-4-pyrrolidinocarbonylpiperidino)propionamide,
N-(allyl-N-2-phenylcyclopropyl)-β-(4-phenyl-4-pyrrolidinocarbonylpiperidino)propionamide,
N-(propargyl-N-2-phenylcyclopropyl)-β-(4-phenyl-4-pyrrolidinocarbonylpiperidino)propionamide,
N-(butyl-N-2-phenylcyclopropyl)-β-(4-phenyl-4-pyrrolidinocarbonylpiperidino)propionamide,
N-(ethinyl-N-2-phenylcyclopropyl)-β-(4-phenyl-4-pyrrolidinocarbonylpiperidino)propionamide,
N-(1-butinyl-N-2-phenylcyclopropyl)-β-(4-phenyl-4-pyrrolidinocarbonylpiperidino)propionamide,
N-(1-propenyl-N-2-phenylcyclopropyl)-β-(4-phenyl-4-pyrrolidinocarbonylpiperidino)propionamide,
N-(ethyl-N-2-phenylcyclopropyl)-β-(4-phenyl-4-pyrrolidinocarbonylpiperidino)propionamide,
N-(methyl-N-2-4-trifluoromethylphenylcyclopropyl)-β-(4-phenyl-4-pyrrolidinocarbonylpiperidino)propionamide,
N-(allyl-N-2-4-fluorophenylcyclopropyl)-β-(4-phenyl-4-pyrrolidinocarbonylpiperidino)propionamide,
N-(propargyl-N-2-3,4-methylenedioxyphenylcyclopropyl)-β-(4-phenyl-4-pyrrolidinocarbonylpiperidino)propionamide,
N-(methyl-N-2-3-trifluoromethylphenylcyclopropyl)-β-(4-phenyl-4-pyrrolidinocarbonylpiperidino)propionamide,
N-(methyl-N-2-2,6-dichlorophenylcyclopropyl)-β-(4-phenyl-4-pyrrolidinocarbonylpiperidino)propionamide,
N-(methyl-N-2-2-methyl-4-trifluoromethylphenylcyclopropyl)-β-(4-phenyl-4-pyrrolidinocarbonylpiperidino)proionamide and
N-(cyclopropyl-N-2-phenylcyclopropyl)-β-(4-phenyl-4-pyrrolidinocarbonylpiperidino)propionamide, respectively.

EXAMPLE 10

When, in the procedure of Example 3, 4 - phenyl-4-pyrrolidinocarbonylpiperidine is replaced by an equal molar amount of 4-phenyl-4-piperidinocarbonylpiperidine,
4-phenyl-4-morpholinocarbonylpiperidine,
4-phenyl - 4 - 1,2,3,4 - tetrahydroisoquinolinocarbonylpiperidine,
4-phenyl - 4 - 1,2,5,6 - tetrohydropyridinocarbonylpiperidine,
4-phenyl-4-imidazolinocarbonylpiperidine,
4-phenyl-4-hexamethyleneiminocarbonylpiperidine, 4-phenyl-4-N'-methylpiperazinocarbonylpiperidine,
4-phenyl-4-N'-hydroxypiperazinocarbonylpiperidine,
4-phenyl-4-N'-hydroxyethylpiperazinocarbonylpiperidine,
4-phenyl-4-N'-ethylpiperazinocarbonylpiperidine,
4 - 4 - trifluoromethylphenyl - 4 - pyrrolidinocarbonylpiperidine,
4-4-chlorophenyl-4-piperidinocarbonylpiperidine,
4-2-bromophenyl-4-pyrrolidinocarbonylpiperidine,
4-4-methylphenyl-4-pyrrolidinocarbonylpiperidine,
4-2,4-dimethylphenyl-4-pyrrolidinocarbonylpiperidine,
4-3,4 - methylenedioxyphenyl - 4 - morpholinocarbonylpiperidine,
4-3-methoxyphenyl-4-morpholinocarbonylpiperidine,
4-4-ethylphenyl-4-piperidinocarbonylpiperidine,
4-2-phenylphenyl-4-piperidinocarbonylpiperidine,
4 - 3 - iodophenyl - 4 - N' - methylpiperazinocarbonylpiperidine,
4-2-methylthiophenyl-4-pyrrolidinocarbonylpiperidine,
4 - 4 - trifluoromethylphenyl - 4 - piperidinocarbonylpiperidine,
4-3-phenoxyphenyl-4-piperidinocarbonylpiperidine,
4- 2 - dimethylsulfamylphenyl - 4 - pyrrolindinocarbonylpiperidine,
4-3-benzylphenyl-4-pyrrolidinocarbonylpiperidine,
4-4-phenylphenyl-4-pyrrolidinocarbonylpiperidine,
4-2 - trifluoromethylphenyl - 4 - morpholinocarbonylpiperidine,
4-2 - chloro - 4 - methylphenyl - 4 - pyrrolidinocarbonylpiperidine,
4-3-chlorophenyl - 4 - hexamethyleneiminocarbonylpiperidine and
4-2,6-dichlorophenyl - 4 - pyrrolidinocarbonylpiperidine, there are obtained, N-(2 - phenylcyclopropyl) - β - (4 - phenyl - 4 - piperidinocarbonylpiperidino)propionamide,
N - (2 - phenylcyclopropyl) - β -(4 - phenyl - 4 - morpholinocarbonylpiperidino)propionamide,
N - (2 - phenylcyclopropyl) - β - (4 - phenyl - 4 - 1,2,3,4-tetrahydroisoquinolinocarbonylpiperidino)propionamide,
N - (2 - phenylcylropropyl) - β - (4 - phenyl - 4- 1,2,5,6 - tetrahydropyridinocarbonylpiperidino) propionamide,
N - (2 - phenylcyclopropyl) - β - (4 - phenyl - 4- imidazolinocarbonylpiperidino)propionamide,
N - (2 - phenylcyclopropyl) - β - (4 - phenyl - 4 - hexamethyleneiminocarbonylpiperidino)propionamide,
N - (2 - phenylcyclopropyl) - β - (4 - phenyl - 4 - N'-methylpiperazinocarbonylpiperidino)propionamide,
N - (2 - phenylcyclopropyl) - β - (4 - phenyl - 4 - N'-hydroxypiperazincarbonylpiperidino)propionamide,
N - (2 - phenylcylopropyl) - β - (4 - phenyl-4-N'-hydroxyethylpiperazinocarbonylpiperidino)propionamide,
N-(2-phenylcyclopropyl) - β - (4-phenyl-4-N'-ethylpiperazinocarbonylpiperidino)propionamide,
N - (2 - phenylcyclopropyl) - β - (4 - 4 - trifluoromethylphenyl - 4 - pyrrolidinocarbonylpiperidino)propionamide,
N - (2 - phenylcyclopropyl) - β - (4-4-chlorophenyl-4-piperidinocarbonylpiperidino)propionamide,
N - (2 - phenylcyclopropyl) - β - (4 - 2 - bromophenyl-4 - pyrrolidinocarbonylpiperidino)propionamide,
N - (2 - phenylcyclopropyl) - β - (4 - 4 - methylphenyl-4-pyrrolidinocarbonylpiperidino)propionamide,
N - (2 - phenylcyclopropyl) - β - (4 - 2,4 - dimethylphenyl - 4 - pyrrolidinocarbonylpiperidino)propionamide,
N - (2 - phenylcyclopropyl) - β - (4 - 3,4 - methylenedioxyphenyl - 4 - morpholinocarbonylpiperidino)propionamide,
N - (2 - phenylcyclopropyl) - β - (4 - 3 - methoxyphenyl-4 - morpholinocarbonylpiperidino)propionamide,
N - (2 - phenylcyclopropyl) - β - (4 - 4 - ethylphenyl - 4-piperidinocarbonylpiperidino)propionamide,
N - (2 - phenylcyclopropyl) - β - (4 - 2 - phenylphenyl-4 - piperidinocarbonylpiperidino)propionamide,
N - (2 - phenylcyclopropyl) - β - (4 - 3 - iodophenyl - 4-N'-methylpiperazinocarbonylpiperidino)propionamide,
N - (2 - phenylcyclopropyl) - β - (4-2-methylthiophenyl-4 - pyrrolidinocarbonylpiperidino)propionamide,
N - (2 - phenylcyclopropyl) - β - (4 - 4 - trifluoromethylphenyl - 4 - piperidinocarbonylpiperidino)propionamide,
N - (2 - phenylcyclopropyl) - β - (4 - 3 - phenoxyphenyl-4 - piperidinocarbonylpiperidino)propionamide,
N - (2 - phenylcyclopropyl) - β-(4-2-dimethylsulfamylphenyl - 4 - pyrrolidinocarbonylpiperidino)propionamide,
N - (2 - phenylcyclopropyl) - β - (4 - 3 - benzylphenyl-4-pyrrolidinocarbonylpiperidino)propionamide,
N - (2 - phenylcyclopropyl) - β - (4 - 4 - phenylphenyl-4-pyrrolidinocarbonylpiperidino)propionamide,
N - (2 - phenylcyclopropyl) - β - (4 - 2 - trifluoromethylphenyl - 4 - morpholinocarbonylpiperidino)propionamide,
N - (2 - phenylcyclopropyl) - β - (4-2-chloro-4-methylphenly - 4 - pyrrolidinocarbonylpiperidino)propionamide,
N - (2 - phenylcyclopropyl) - β - (4 - 3 - chlorophenyl-4-hexamethyleneiminocarbonylpiperidino)propionamide and
N - (2 - phenylcyclopropyl) - β - (4-2,6-dichlorophenyl-4 - pyrrolidinocarbonylpiperidino)propionamide, respectively.

EXAMPLE 11

When, in the procedure of Example 5, N-benzyl-β-chloropropionamide is replaced by an equal molar amount of N-β-naphthyl-β-chloropropionamide,
N-α-naphthyl-β-chloroproprionamide,
N-3-thienyl-β-chloropropionamide,
N-2-thienyl-β-chloropropionamide,
N-1-pyridyl-β-chloropropionamide,
N-3-thienylmethyl-β-chloropropionamide,
N-1-pyridylmethyl-β-chloropropionamide,
N-2-thienylethyl-β-chloropropionamide,
N-4-isoxazolyl-β-chloropropionamide,
N-1-pyrimidyl-β-chloropropionamide,
N-3-chlorobenzyl-β-chloropropionamide,
N-3-methyl-4-chlorobenzyl-β-chloropropionamide,
N-3-methoxybenzyl-β-chloropropionamide,
N-3,4-methylenedioxybenzyl-β-chloropropionamide,
N-2,6-dibromobenzyl-β-chloropropionamide,
N-3,4-dimethylbenzyl-β-chloropropionamide,
N-2-bromo-4-chlorobenzyl-β-chloropropionamide,
N-4-fluorobenzyl-β-chloropropionamide,
N-4-trifluoromethylbenzyl-β-chloropropionamide,
N-3-methylthiobenzyl-β-chloropropionamide,
N-2-methoxybenzyl-β-chloropropionamide,
N-2,6-dimethoxybenzyl-β-chloropropionamide,
N-phenethyl-β-chloropropionamide,
N-4-iodobenzyl-β-chloropropionamide,
N-3-fluorobenzyl-β-chloropropionamide,
N-4-methylbenzyl-β-chloropropionamide,
N-2-butylbenzyl-β-chloropropionamide,
N-3-benzylbenzyl-β-chloropropionamide,
N-4-phenylbenzyl-β-chloropropionamide,
N-4-phenoxybenzyl-β-chloropropionamide,
N-3-dimethylsulfamylbenzyl-β-chloropropionamide,
N-phenylisopropyl-β-chloropropionamide,
N-phenyl-β-chloropropionamide,
N-4-trifluoromethylphenyl-β-chloropropionamide,
N-3-chlorophenyl-β-chloropropionamide,
N-4-methylphenyl-β-chloropropionamide,
N-2-pentylphenyl-β-chloropropionamide,
N-3-phenoxyphenyl-β-chloropropionamide, N-4-phenylphenyl-β-chloropropionamide,
N-2-benzylphenyl-β-chloropropionamide,
N-4-methylthiophenyl-β-chloropropionamide,
N-3-methoxyphenyl-β-chloropropionamide,
N-2,6-dimethylphenyl-β-chloropropionamide,
N-2-bromophenyl-β-chloropropionamide,
N-3-iodophenyl-β-chloropropionamide,
N-4-fluorophenyl-β-chloropropionamide,
N-3-dimethylsulfamylphenyl-β-chloropropionamide,
N-cinnamyl-β-chloropropionamide,
N-cyclopropyl-N-benzyl-β-chloropropionamide,
N-cyclopropyl-N-phenyl-β-chloropropionamide,
N-cyclohexyl-N-benzyl-β-chloropropionamide,
N-methyl-N-benzyl-β-chloropropionamide,
N-allyl-N-benzyl-β-chloropropionamide,
N-propargyl-N-phenyl-β-chloropropionamide,
N-1-butinyl-N-4-trifluoromethylbenzyl-β-chloropropionamide,
N-1-propenyl-N-1-pyridyl-β-chloropropionamide,
N-isopropyl-N-cinnamyl-β-chloropropionamide,
N-benzyl-α-chloroacetamide,
N-benzyl-α-chloropropionamide,
N-benzyl-γ-chlorobutyramide,
N-benzyl-α-chloroisobutyramide,
N-benzyl-γ-chlorohexanoamide,
N-4-trifluoromethylbenzyl-α-chloroacetamide,
N-phenyl-α-chloroacetamide,
N-3-thienyl-α-chloropropionamide,
N-methyl-N-benzyl-α-chloroacetamide,
N-2-4-chlorophenylcyclopropyl-β-chloropropionamide,
N-2-4-trifluoromethylphenylcyclopropyl-β-chloropropionamide,
N-2-4-methylphenylcyclopropyl-β-chloropropionamide,
N-2-2-fluorophenylcyclopropyl-β-chloropropionamide,
N-2-3-methylphenylcyclopropyl-β-chloropropionamide,
N-2-3-bromophenylcyclopropyl-β-chloropropionamide,
N-2-2,6-dichlorophenylcyclopropyl-β-chloropropionamide,
N-2-4-methylthiophenylcyclopropyl-β-chloropropionamide,
N-2-2-dimethylsulfamylphenylcyclopropyl-β-chloropropionamide,
N-2-2-iodo-4-methylphenylcyclopropyl-β-chloropropionamide,
N-2-4-isopropylphenylcyclopropyl-β-chloropropionamide,
N-2-4-phenylphenylcyclopropyl-β-chloropropionamide,
N-2-3-phenoxyphenylcyclopropyl-β-chloropropionamide,
N-2-4-benzylphenylcyclopropyl-β-chloropropionamide,
N-2-3,4-methylenedioxyphenylcyclopropyl-β-chloropropionamide,
N-2-4-fluorophenylcyclopropyl-β-chloropropionamide,
N-2-2,4-dimethylphenylcyclopropyl-β-chloropropionamide,
N-methyl-N-2-phenylcyclopropyl-β-chloropropionamide,
N-isopropyl-N-2-phenylcyclopropyl-β-chloropropionamide,
N-allyl-N-2-phenylcyclopropyl-β-chloropropionamide,
N-propargyl-N-2-phenylcyclopropyl-β-chloropropionamide,
N-butyl-N-2-phenylcyclopropyl-β-chloropropionamide,
N-ethinyl-N-2-phenylcyclopropyl-β-chloropropionamide,
N-1-butinyl-N-2-phenylcyclopropyl-β-chloropropionamide,
N-1-propenyl-N-2-phenylcyclopropyl-β-chloropropionamide,
N-ethyl-N-2-phenylcyclopropyl-β-chloropropionamide,
N-methyl-N-2-4-trifluoromethylphenylcyclopropyl-β-chloropropionamide,
N-allyl-N-2-4-fluorophenylcyclopropyl-β-chloropropionamide,
N-propargyl-N-2-3,4-methylenedioxyphenylcyclopropyl-β-chloropropionamide,
N-methyl-N-2-3-trifluoromethylphenylcyclopropyl-β-chloropropionamide,
N-methyl-N-2-2,6-dichlorophenylcyclopropyl-β-chloropropionamide,
N-methyl-N-2-2-methyl-4-trifluoromethylphenylcyclopropyl-β-chloropropionamide and
N-cyclopropyl-N-phenylcyclopropyl-β-chloropropionamide, there are obtained,
N-(β-naphthyl)-β-(4-phenyl-4-piperidinocarbonylpiperidino)propionamide,
N-(α-naphthyl)-β-(4-phenyl-4-piperidinocarbonylpiperidino)propionamide,
N-(3-thienyl)-β-(4-phenyl-4-piperidinocarbonylpiperidino)propionamide,
N-(2-thienyl)-β-(4-phenyl-4-piperidinocarbonylpiperidino)propionamide,
N-(1-pyridyl)-β-(4-phenyl-4-piperidinocarbonylpiperidino)propionamide,
N-(3-thienylmethyl)-β-(4-phenyl-4-piperidinocarbonylpiperidino)propionamide,
N-(1-pyridylmethyl)-β-(4-phenyl-4-piperidinocarbonylpiperidino)propionamide,
N-(2-thienylethyl)-β-(4-phenyl-4-piperidinocarbonylpiperidino)propionamide,
N-(4-isoxazolyl)-β-(4-phenyl-4-piperidinocarbonylpiperidino)propionamide,
N-(1-pyrimidyl)-β-(4-phenyl-4-piperidinocarbonylpiperidino)propionamide,
N-(3-chlorobenzyl)-β-(4-phenyl-4-piperidinocarbonylpiperidino)propionamide,
N-(3-methyl-4-chlorobenzyl)-β-(4-phenyl-4-piperdinocarbonylpiperidino)propionamide,
N-(3-methoxybenzyl)-β-(4-phenyl-4-piperidinocarbonylpiperidino) propionamide,
N-(3,4-methylenedioxybenzyl)-β-(4-phenyl-4-piperidinocarbonylpiperidino)propionamide,
N-(2,6-dibromobenzyl)-β-(4-phenyl-4-piperidinocarbonylpiperidinopropionamide,
N-(3,4-dimethylbenzyl)-β-(4-phenyl-4-piperidinocarbonylpiperidino)propionamide,
N-(2-bromo-4-chlorobenzyl)-β-(4-phenyl-4-piperidinocarbonylpiperidino)propionamide,
N-(4-fluorobenzyl)-β-(4-phenyl-4-piperidinocarbonylpiperidino)propionamide,
N-(4-trifluoromethylbenzyl)-β-(4-phenyl-4-piperidinocarbonylpiperidino)propionamide,
N-(3-methylethiobenzyl)-β-(4-phenyl-4-piperidinocarbonylpiperidino)propionamide,
N-(2-methoxybenzyl)-β-(4-phenyl-4-piperidinocarbonylpiperidino)propionamide,
N-(2,6-dimethoxybenzyl)-β-(4-phenyl-4-piperidinocarbonylpiperidino)propionamide,
N-(phenethyl)-β-(4-phenyl-4-piperidinocarbonylpiperidino)propionamide,
N-(4-iodobenzyl)-β-(4-phenyl-4-piperidinocarbonylpiperidino)propionamide,
N-(3-fluorobenzyl)-β-(4-phenyl-4-piperidinocarbonylpiperidino)propionamide,
N-(4-methylbenzyl)-β-(4-phenyl-4-piperidinocarbonylpiperidino)propionamide,
N-(2-butylbenzyl)-β-(4-phenyl-4-piperidinocarbonylpiperidino)propionamide,
N-(3-benzylbenzyl)-β-(4-phenyl-4-piperidinocarbonylpiperidino)propionamide,
N-(4-phenylbenzyl)-β-(4-phenyl-4-piperidinocarbonylpiperidino)propionamide,
N-(4-phenoxybenzyl)-β-(4-phenyl-4-piperidinocarbonylpiperidino)propionamide,
N-(3-dimethylsulfamylbenzyl)-β-(4-phenyl-4-piperidinocarbonylpiperidino)propionamide,
N-(phenylisopropyl)-β-(4-phenyl-4-piperidinocarbonylpiperidino)propionamide,
N-(phenyl)-β-(4-phenyl-4-piperidinocarbonylpiperidino)propionamide,
N-(4-trifluoromethylphenyl)-β-(4-phenyl-4-piperidinocarbonylpiperidino)propionamide, N-(3-chlorophenyl)-β-(4-phenyl-4-piperidinocarbonyl-piperidino)propionamide,
N-(4-methylphenyl)-β-(4-phenyl-4-piperidinocarbonyl-piperidino)propionamide,
N-(2-pentylphenyl)-β-(4-phenyl-4-piperidinocarbonyl-piperidino)propionamide,
N-(3-phenoxyphenyl)-β-(4-phenyl-4-piperidinocarbonyl-piperidino)propionamide,
N-(4-phenylphenyl)-β-(4-phenyl-4-piperidinocarbonyl-piperidino)propionamide,
N-(2-benzylphenyl)-β-(4-phenyl-4-piperidinocarbonyl-piperidino)propionamide,
N-(4-methylthiophenyl)-β-(4-phenyl-4-piperidinocarbonylpiperidino)propionamide,
N-(3-methoxyphenyl)-β-(4-phenyl-4-piperidinocarbonylpiperidino)propionamide,
N-(2,6-dimethylphenyl)-β-(4-phenyl-4-piperidinocarbonylpiperidino)propionamide,
N-(2-bromophenyl)-β-(4-phenyl-4-piperidinocarbonylpiperidino)propionamide,
N-(3-iodophenyl)-β-(4-phenyl-4-piperidinocarbonyl-piperidino)propionamide,
N-(4-fluorophenyl)-β-(4-phenyl-4-piperidinocarbonyl-piperidino)propionamide,
N-(3-dimethylsulfamylphenyl)-β-(4-phenyl-4-piperidinocarbonylpiperidino)propionamide,
N-(cinnamyl)-β-(4-phenyl-4-piperidinocarbonyl-piperidino)propionamide,
N-(cyclopropyl-N-benzyl)-β-(4-phenyl-4-piperidinocarbonylpiperidino)propionamide,
N-(cyclopropyl-N-phenyl)-β-(4-phenyl-4-piperidinocarbonylpiperidino)propionamide,
N-(cyclohexyl-N-benzyl)-β-(4-phenyl-4-piperidinocarbonylpiperidino)propionamide,
N-(methyl-N-benzyl)-β-(4-phenyl-4-piperidinocarbonyl-piperidino)propionamide,
N-(allyl-N-benzyl)-β-(4-phenyl-4-piperidinocarbonyl-piperidino)propionamide,
N-(propargyl-N-phenyl)-β-(4-phenyl-4-piperidinocarbonylpiperidino)propionamide,
N-(1-butinyl-N-4-trifluoromethylbenzyl)-β-(4-phenyl-4-piperidinocarbonylpiperidino)propionamide,
N-(1-propenyl-N-1-pyridyl)-β-(4-phenyl-4-piperidinocarbonylpiperidino)propionamide,
N-(isopropyl-N-cinnamyl)-β-(4-phenyl-4-piperidinocarbonylpiperidino)propionamide,
N-(benzyl-α-(4-phenyl-4-piperidinocarbonylpiperidino)acetamide,
N-(benzyl-α-(4-phenyl-4-piperidinocarbonylpiperidino)propionamide,
N-(benzyl)-γ-(4-phenyl-4-piperidinocarbonyl-piperidino)butyramide,
N-(benzyl-α-(4-phenyl-4-piperidinocarbonylpiperidino)isobutyramide,
N-(benzyl)-γ-(4-phenyl-4-piperidinocarbonyl-piperidino)hexanoamide,
N-(4-trifluoromethylbenzyl)-α-(4-phenyl-4-piperidinocarbonylpiperidono)acetamide,
N-(phenyl)-α-(4-phenyl-4-piperidinocarbonyl-piperidino)acetamide,
N-(3-thienyl)-α-(4-phenyl-4-piperidinocarbonylpiperidino)propionamide,
N-(methyl-N-benzyl)-α-(4-phenyl-4-piperidinocarbonylpiperidino)acetamide,
N-(2-4-chlorophenylcyclopropyl)-β-(4-phenyl-4-piperidinocarbonyl-piperidino)propionamide,
N-(2-4-trifluoromethylphenylcyclopropyl)-β-(4-phenyl-4-piperidinocarbonylpiperidino)propionamide,
N-(2-4-methylphenylcyclopropyl)-β-(4-phenyl-4-piperidinocarbonylpiperidino)propionamide,
N-(2-2-fluorophenylcyclopropyl)-β-(4-phenyl-4-piperidinocarbonylpiperidino)propionamide,
N-(2-3-methylphenylcyclopropyl)-β-(4-phenyl-4-piperidinocarbonylpiperidino)propionamide,
N-(2-3-bromophenylcyclopropyl)-β-(4-phenyl-4-piperidinocarbonylpiperidino)propionamide,
N-(2-2,6-dichlorophenylcyclopropyl)-β-(4-phenyl-4-piperidinocarbonylpiperidino)propionamide,
N-(2-4-methylthiophenylcyclopropyl)-β-(4-phenyl-4-piperidinocarbonylpiperidino)propionamide,
N-(2-2-dimethylsulfamylphenylcyclopropyl)-β-(4-phenyl-4-piperidinocarbonylpiperidino)propionamide,
N-(2-2-iodo-4-methylphenylcyclopropyl)-β-(4-phenyl-4-piperidinocarbonylpiperidino)propionamide,
N-(2-4-isopropylphenylcyclopropyl)-β-(4-phenyl-4-piperidinocarbonylpiperidino)propionamide,
N-(2-4-phenylphenylcyclopropyl)-β-(4-phenyl-4-piperidinocarbonylpiperidino)propionamide,
N-(2-3-phenoxyphenylcyclopropyl)-β-(4-phenyl-4-piperidinocarbonylpiperidino)propionamide,
N-(2-4-benzylphenylcyclopropyl)-β-(4-phenyl-4-piperidinocarbonylpiperidino)propionamide,
N-(2,3,4-methylenedioxyphenylcyclopropyl)-β-(4-phenyl-4-piperidinocarbonylpiperidino)propionamide,
N-(2-4-fluorophenylcyclopropyl)-β-(4-phenyl-4-piperidinocarbonylpiperidino)propionamide,
N-(2-2,4-dimethylphenylcyclopropyl)-β-(4-phenyl-4-piperidinocarbonylpiperidino)propionamide,
N-(methyl-N-2-phenylcyclopropyl)-β-(4-phenyl-4-piperidinocarbonylpiperidino)propionamide,
N-(isopropyl-N-2-phenylcyclopropyl)-β-(4-phenyl-4-piperidinocarbonylpiperidino)propionamide,
N-(allyl-N-2-phenylcyclopropyl)-β-(4-phenyl-4-piperidinocarbonylpiperidino)propionamide,
N-(propargyl-N-2-phenylcyclopropyl)-β-(4-phenyl-4-piperidinocarbonylpiperidino)propionamide,
N-(butyl-N-2-phenylcyclopropyl)-β-(4-phenyl-4-piperidinocarbonylpiperidino)propionamide,
N-(ethinyl-N-2-phenylcyclopropyl)-β-(4-phenyl-4-piperidinocarbonylpiperidino)propionamide,
N-(1-butinyl-N-2-phenylcyclopropyl)-β-(4-phenyl-4-piperidinocarbonylpiperidino)propionamide,
N-(1-propenyl-N-2-phenylcyclopropyl)-β-(4-phenyl-4-piperidinocarbonylpiperidino)propionamide,
N-(ethyl-N-2-phenylcyclopropyl)-β-(4-phenyl-4-piperidinocarbonylpiperidino)propionamide,
N-(methyl-N-2-4-trifluoromethylphenylcyclopropyl)-β-(4-phenyl-4-piperidinocarbonylpiperidino)propionamide,
N-(allyl-N-2-4-fluorophenylcyclopropyl)-β-(4-phenyl-4-piperidinocarbonylpiperidino)propionamide,
N-(propargyl-N-2-3,4-methylenedioxyphenylcyclopropyl)-β-(4-phenyl-4-piperidinocarbonylpiperidino)-propionamide,
N-(methyl-N-2-3-trifluoromethylphenylcyclopropyl)-β-(4-phenyl-4-piperidinocarbonylpiperidino)propionamide,
N-(methyl-N-2-2,6-dichlorophenylcyclopropyl)-β-(4-phenyl-4-piperidinocarbonylpiperidino)propionamide,
N-(methyl-N-2-2-methyl-4-trifluoromethylphenylcyclopropyl)-β-(4-phenyl-4-piperidinocarbonylpiperidino)-propionamide and
N-(cyclopropyl-N-phenylcyclopropyl)-β-(4-phenyl-4-piperidinocarbonylpiperidino)propionamide, respectively.

Thus, it is apparent from the foregoing description that the objects of this invention have been attained. Novel compounds have been invented which have antiarrhythmic activity. In addition, a novel method of treating cardiac arrhythmia has been invented.

While this invention has been described and exemplified in terms of its preferred embodiment, those skilled in the art will appreciate that modifications can be made without departing from the spirit and scope of this invention.

What is claimed is:
1. A compound selected from the group consisting of compounds of the formula

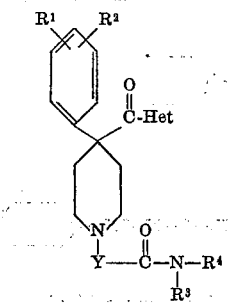

wherein
Het is a heterocyclic ring selected from the group consisting of pyrrolidino, piperidino, morpholino, N'-(lower)alkylpiperazino, N'-hydroxy(lower)alkylpiperazino, N'-hydroxypiperidino, imidazolino, 1,2,3,4-tetrahydroisoquinolino, 1,2,5,6-tetrahydropyridino, hexamethyleneimino;
$R^1$ and $R^2$ are each a member selected from the group consisting of hydrogen, chloro, bromo, iodo, fluoro, trifluoromethyl, (lower)alkyl, (lower)alkoxy, (lower)alkylthio, di(lower)alkylsulfamyl, phenyl, phenoxy, benzyl, and when taken together, methylenedioxy;
$R^3$ is a member selected from the group consisting of hydrogen, (lower)alkyl, (lower)alkenyl, (lower)alkynyl and cycloalkyl radicals having from 3 to 7 carbon atoms, inclusive;
$R^4$ is a member selected from the group consisting of thienyl, pyridyl, pyrimidyl, isoxazolyl, thienyl(lower)alkyl, pyridyl(lower)alkyl, naphthyl, Ph-, Ph-(lower)alkyl, Ph-(lower)alkenyl and Ph-cyclopropyl, wherein Ph- is a radical of the formula

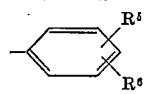

wherein $R^5$ and $R^6$ are each a member selected from the group consisting of hydrogen, chloro, bromo, iodo, fluoro, trifluoromethyl, (lower)alkyl, (lower)alkoxy, (lower)alkylthio, di(lower)alkylsulfamyl, phenyl, phenoxy, benzyl, and when taken together, methylenedioxy;
Y is (lower)alkylene;
and the pharmaceutically acceptable nontoxic salts thereof.

2. A compound having the formula

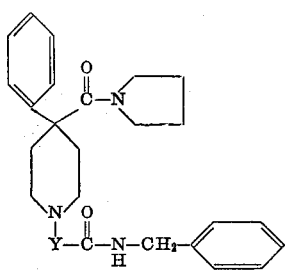

wherein Y is (lower)alkylene.

3. A compound having the formula

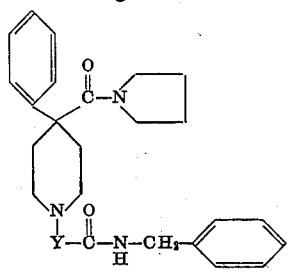

wherein Y is (lower)alkylene.

4. A compound having the formula

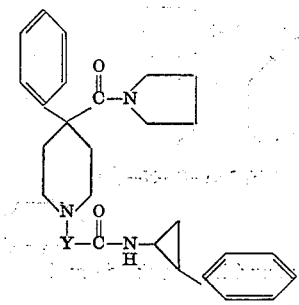

wherein Y is (lower)alkylene.

5. A compound having the formula

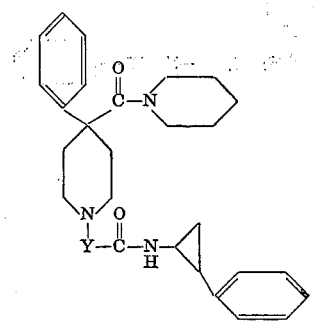

wherein Y is (lower)alkylene.

6. The compound having the formula

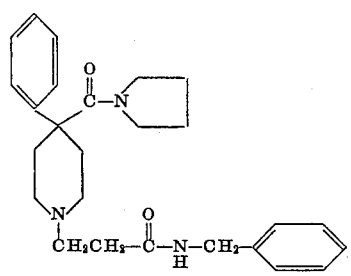

7. The compound having the formula

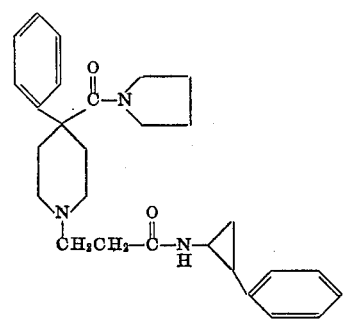

8. The compound having the formula
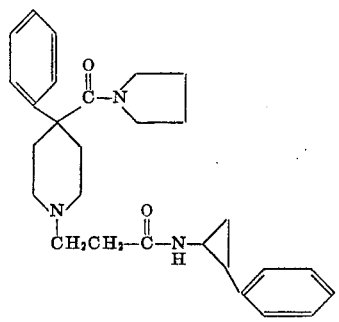
9. The compound having the formula
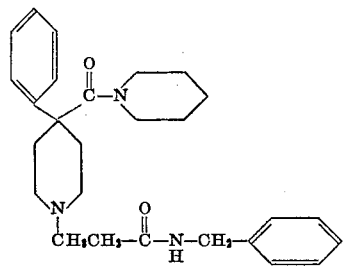
10. The compound having the formula
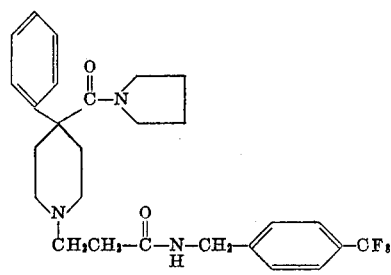
References Cited
UNITED STATES PATENTS
| | | | |
|---|---|---|---|
| 3,061,609 | 10/1962 | Cusic et al. | 260—294 |
| 3,097,209 | 7/1963 | Janssen | 260—294 |
| 3,117,128 | 1/1964 | Mooradian | 260—293.45 |
| 3,117,139 | 1/1964 | Mooradian | 260—294 |
| 3,154,557 | 10/1964 | Zenitz | 260—294 |
WALTER A. MODANCE, *Primary Examiner.*
A. D. SPEVACK, *Assistant Examiner.*